US008682920B2

(12) United States Patent
Sakiyama et al.

(10) Patent No.: US 8,682,920 B2
(45) Date of Patent: Mar. 25, 2014

(54) INFORMATION PROVIDING APPARATUS, INFORMATION PROVIDING METHOD, AND INFORMATION PROVIDING PROGRAM EMBODIED ON COMPUTER READABLE MEDIUM

(75) Inventors: Daisuke Sakiyama, Chiyoda-ku (JP); Kenichi Takahashi, Chiyoda-ku (JP); Takeshi Minami, Chiyoda-ku (JP); Kazuaki Tomono, Chiyoda-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 205 days.

(21) Appl. No.: 12/724,591

(22) Filed: Mar. 16, 2010

(65) Prior Publication Data

US 2010/0241653 A1 Sep. 23, 2010

(30) Foreign Application Priority Data

Mar. 17, 2009 (JP) ................. 2009-064857

(51) Int. Cl.
 *G06F 17/30* (2006.01)
(52) U.S. Cl.
 USPC .......................................... 707/769; 715/753
(58) Field of Classification Search
 USPC .................... 707/104, 10; 382/305
 See application file for complete search history.

(56) References Cited

U.S. PATENT DOCUMENTS

| | | | |
|---|---|---|---|
| 6,128,635 A | 10/2000 | Ikeno | |
| 6,346,933 B1 | 2/2002 | Lin | |
| 6,457,026 B1 | 9/2002 | Graham et al. | |
| 6,512,507 B1 * | 1/2003 | Furihata et al. | 345/157 |
| 7,359,094 B1 * | 4/2008 | Sayuda | 358/3.28 |
| 7,420,150 B2 * | 9/2008 | Kanatsu | 250/208.1 |

(Continued)

FOREIGN PATENT DOCUMENTS

| | | |
|---|---|---|
| EP | 0 810 534 | 12/1997 |
| EP | 1 087 327 | 3/2001 |

(Continued)

OTHER PUBLICATIONS

Itoh et al., "Comparison and Taxonomy about Dictionary Looking Up Methods on WWW" IPSJ SIG Technical Reports [Human Interface], Published by information Processing Society of Japan, Jan. 11, 1996, vol. 96, No. 1, pp. 49-54, 96-HI-64-9.

(Continued)

*Primary Examiner* — James Trujillo
*Assistant Examiner* — Thong Vu
(74) *Attorney, Agent, or Firm* — Buchanan Ingersoll & Rooney PC

(57) ABSTRACT

In order to automatically enrich the contents of presentation, MFP includes a display control portion for outputting presentation data for display, a specifying instruction accepting portion for accepting an instruction for specifying part of the presentation data, a related information search portion for searching for related information related to a specified part specified by the specifying instruction, a conversion portion for converting the presentation data into transmission data that allows extraction of related information related to the specified part, and a transmission portion for transmitting the transmission data.

21 Claims, 10 Drawing Sheets

(56) References Cited

U.S. PATENT DOCUMENTS

| | | | |
|---|---|---|---|
| 7,421,154 B2* | 9/2008 | Kinjo | 382/305 |
| 7,555,713 B2* | 6/2009 | Yang | 715/248 |
| 7,565,440 B2* | 7/2009 | Omoigui | 709/231 |
| 7,664,733 B2* | 2/2010 | Erol et al. | 707/760 |
| 7,711,722 B1* | 5/2010 | Sahasi et al. | 707/705 |
| 7,809,750 B2* | 10/2010 | Toda | 707/783 |
| 8,150,819 B2* | 4/2012 | Takahashi | 707/705 |
| 8,200,669 B1* | 6/2012 | Iampietro et al. | 707/737 |
| 2003/0193582 A1* | 10/2003 | Kinjo | 348/231.99 |
| 2003/0210229 A1* | 11/2003 | Nishimura et al. | 345/157 |
| 2004/0236791 A1* | 11/2004 | Kinjo | 707/104.1 |
| 2006/0110171 A1* | 5/2006 | Miyazawa et al. | 399/8 |
| 2006/0173859 A1* | 8/2006 | Kim et al. | 707/10 |
| 2006/0197764 A1* | 9/2006 | Yang | 345/473 |
| 2006/0224970 A1* | 10/2006 | Bodin et al. | 715/753 |
| 2006/0294144 A1* | 12/2006 | Shin | 707/104.1 |
| 2007/0279717 A1* | 12/2007 | Ikeno et al. | 358/538 |
| 2008/0196080 A1* | 8/2008 | Ozawa | 725/153 |
| 2008/0222201 A1* | 9/2008 | Chen et al. | 707/104.1 |
| 2009/0240666 A1* | 9/2009 | Noguchi | 707/3 |
| 2010/0027059 A1* | 2/2010 | Ebi | 358/1.15 |
| 2010/0125353 A1* | 5/2010 | Petit-Huguenin | 700/94 |
| 2010/0128309 A1* | 5/2010 | Matoba | 358/1.15 |
| 2010/0211589 A1* | 8/2010 | Tomizawa et al. | 707/768 |

FOREIGN PATENT DOCUMENTS

| | | |
|---|---|---|
| JP | 03-174636 | 7/1991 |
| JP | 06-001487 | 1/1994 |
| JP | 07-230452 | 8/1995 |
| JP | 08-329108 | 12/1996 |
| JP | 2822385 | 11/1998 |
| JP | 3121384 | 12/2000 |
| JP | 2001-125738 A | 5/2001 |
| JP | 2003-132049 | 5/2003 |
| JP | 2004-348231 | 6/2004 |
| JP | 3537260 | 6/2004 |
| JP | 2007-86962 A | 4/2007 |
| JP | 3909554 | 4/2007 |
| JP | 2007-299422 | 11/2007 |
| JP | 4183311 | 11/2008 |
| JP | 2009-157643 | 7/2009 |
| JP | 2010-122799 | 6/2010 |

OTHER PUBLICATIONS

Office Action (Notice of Ground of Rejection) dated Nov. 24, 2010, issued in the corresponding Japanese Patent Application No. 2009-064857, and an English Translation thereof.

* cited by examiner

INFORMATION PROVIDING APPARATUS, INFORMATION PROVIDING METHOD, AND INFORMATION PROVIDING PROGRAM EMBODIED ON COMPUTER READABLE MEDIUM

This application is based on Japanese Patent Application No. 2009-064857 filed with Japan Patent Office on Mar. 17, 2009, the entire content of which is hereby incorporated by reference.

BACKGROUND OF THE INVENTION

1. Field of the Invention

The present invention relates to an information providing apparatus, an information providing method, and an information providing program embodied on a computer readable medium, and more particularly to an information providing apparatus, an information providing method, and an information providing program embodied on a computer readable medium for transmitting images of materials presented in meetings and the like.

2. Description of the Related Art

Illustrations are given by projecting images of materials for illustrations on screens, in meetings and the like. In recent years, materials for illustrations are stored in a computer connected to a projector or the like serving as a display apparatus so that the projector displays the material images output by the computer.

A highlighting technique is also known in which a presenter, for example, uses a laser pointer to underline or hatch characters, etc. that he/she wants to highlight in the image displayed during the illustration. In general, the part to be highlighted by the presenter in the displayed image has often important implications, and highlighting helps the presenter to make the illustration easy to understand.

However, some of listeners who listen to the illustration do not understand the meaning of the highlighted part or want to obtain more detailed information. Unfortunately, the conventional techniques can display materials that help presenters with their illustration but cannot provide materials requested by listeners.

SUMMARY OF THE INVENTION

The present invention is made to solve the aforementioned problem, and an object of the present invention is to provide an information providing apparatus capable of automatically enriching presentation materials.

Another object of the present invention is to provide an information providing method capable of automatically enriching presentation materials.

A further object of the present invention is to provide an information providing program embodied on a computer readable medium, capable of automatically enriching presentation materials.

The present invention is made to solve the aforementioned problem. In accordance with an aspect of the present invention, an information providing apparatus includes: a display portion to output presentation data for display; a specifying instruction accepting portion to accept an instruction for specifying part of the output presentation data; a related information search portion to search for related information related to a specified part specified by the specifying instruction; a conversion portion to convert the presentation data into transmission data that allows extraction of the related information related to the specified part; and a transmission portion to transmit the transmission data.

In accordance with another aspect of the present invention, an information providing method includes the steps of: outputting presentation data for display; accepting an instruction for specifying part of the output presentation data; searching for related information related to a specified part specified by the accepted specifying instruction; converting the presentation data into transmission data in which the specified part is associated with the related information; and transmitting the transmission data.

In accordance with a further aspect of the present invention, an information providing program embodied on a computer readable medium allows a computer to execute the steps of: outputting presentation data for display; accepting an instruction for specifying part of the output presentation data; searching for related information related to a specified part specified by the accepted specifying instruction; converting the presentation data into transmission data in which the specified part is associated with the related information; and transmitting the transmission data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
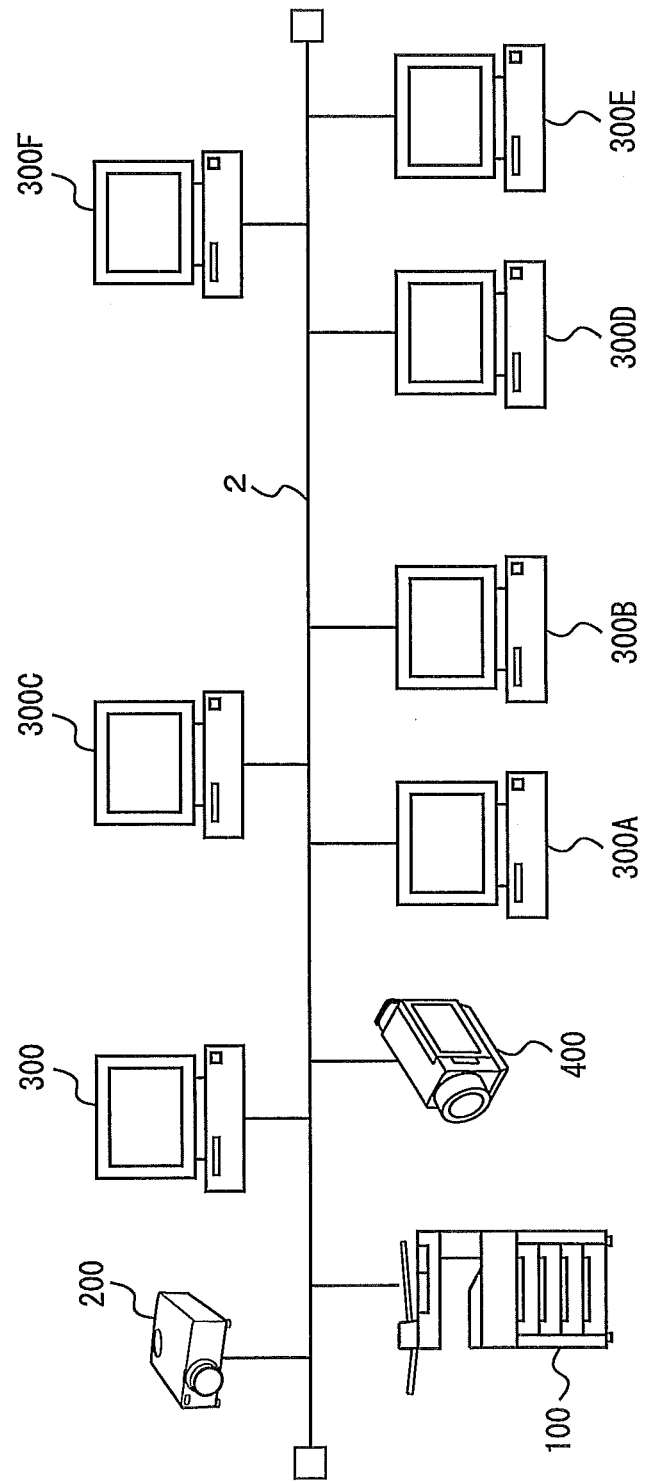
FIG. 1 is a diagram showing an overview of a meeting system in an embodiment of the present invention.

In the following, an embodiment of the present invention will be described with reference to the figures. In the following description, the same parts are denoted with the same reference numerals. Their names and functions are also the same. Therefore, a detailed description thereof will not be repeated.

FIG. 1 is a diagram showing an overview of a meeting system in an embodiment of the present invention. Referring to FIG. 1, a meeting system 1 includes a MFP (Multi Function Peripheral) 100 as an information providing apparatus, a projector 200, a plurality of personal computers (referred to as PC hereinafter) 300, 300A-300F, and a video camera 400, each of which is connected to a network 2. Here, a presenter operates PC 300 to allow projector 200 to project an image of materials and to transmit materials to PC 300A-300F operated by participants, so that the participants view the image projected by projector 200 and the image displayed by PC 300A-300F, by way of example.

Network 2 is a local area network (LAN) and the form of connection can be wired or wireless. In addition, network 2 is not limited to a LAN and can be a wide area network (WAN), a Public Switched Telephone Network (PSTN), the Internet, and so on.

Although a description here will be made to a case where a presentation is given in one meeting room, a meeting may be held among participants present in a plurality of spaces physically separated from each other, using a well-known technique as a so-called teleconference system. In this case, another projector is additionally arranged in a space physically separated from the space in which projector 200 is arranged, and the same images as those displayed by projector 200 are also displayed by another projector.

Projector 200 can communicate with MFP 100 via network 2 to display images received from MFP 100. Projector 200 includes a liquid crystal display, a lens and a light source to display externally input data. Light emitted from the light source passes through the liquid crystal display and radiates out through the lens. When light emitted from a projection portion is applied on a screen, an image that is enlarged from the image displayed on the liquid crystal display is projected on the screen. Any plane having a high reflectivity such as a wall can be used, and in such a case, a screen does not have to be installed. Although projector 200 is taken here as an example, such a display as a liquid crystal display (LCD) or an organic ELD (Electroluminescence Display) may be employed.

Video camera 400 picks up an image of a subject and transmits the picked-up moving images to MFP 100 through network 2. In meeting system 1 in the present embodiment, the angle of view of video camera 400 is adjusted to an image projected by projector 200 on a screen serving as a projection plane, so that the image projected on the screen is picked up as a subject. Therefore, MFP 100 obtains moving images obtained by picking up images projected on the screen by projector 200.

PC 300, 300A-300F are general computers and have application programs installed therein for communicating with MFP 100.

MFP 100 includes a scanner for scanning documents, an image forming apparatus for forming images on a recording medium such as paper based on image data, and a facsimile machine, and has an image scanning function, a copy function, and a facsimile transmission/reception function. Although in the present embodiment MFP 100 is taken as an example of an information providing apparatus, for example, a scanner, a printer, a facsimile, a computer, or the like may used in place of MFP 100 as long as it includes a function of transmitting/receiving image data.

Figure 2:
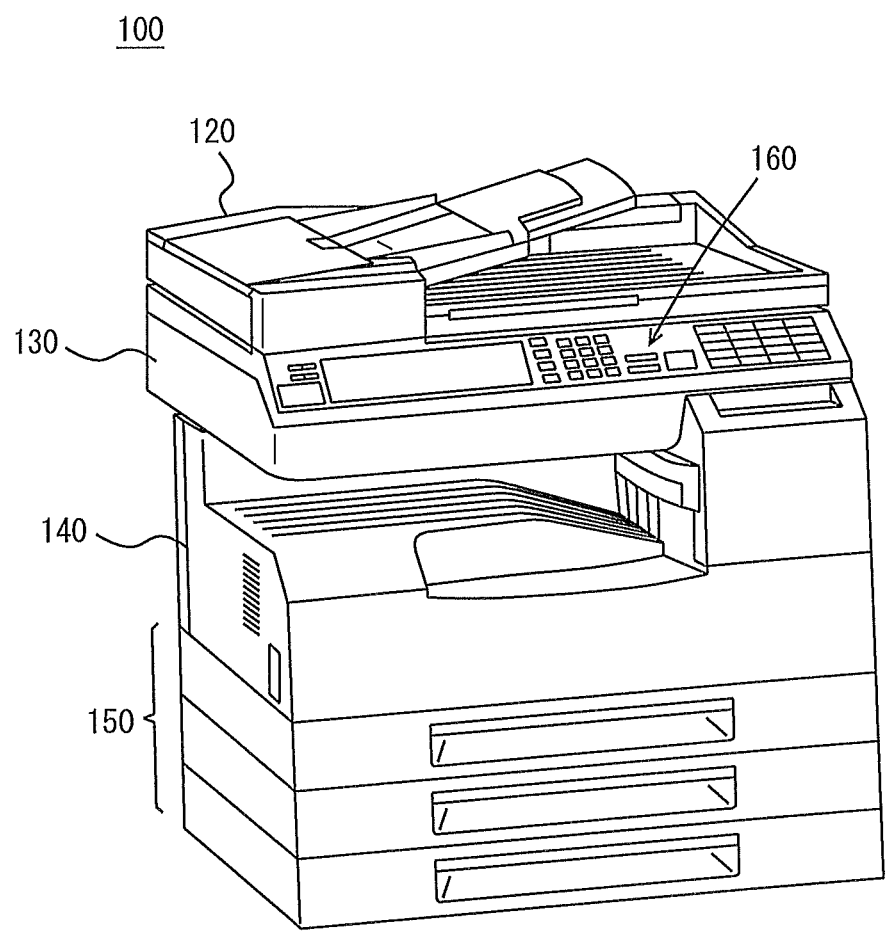
FIG. 2 is an external perspective view of MFP.
Figure 3:
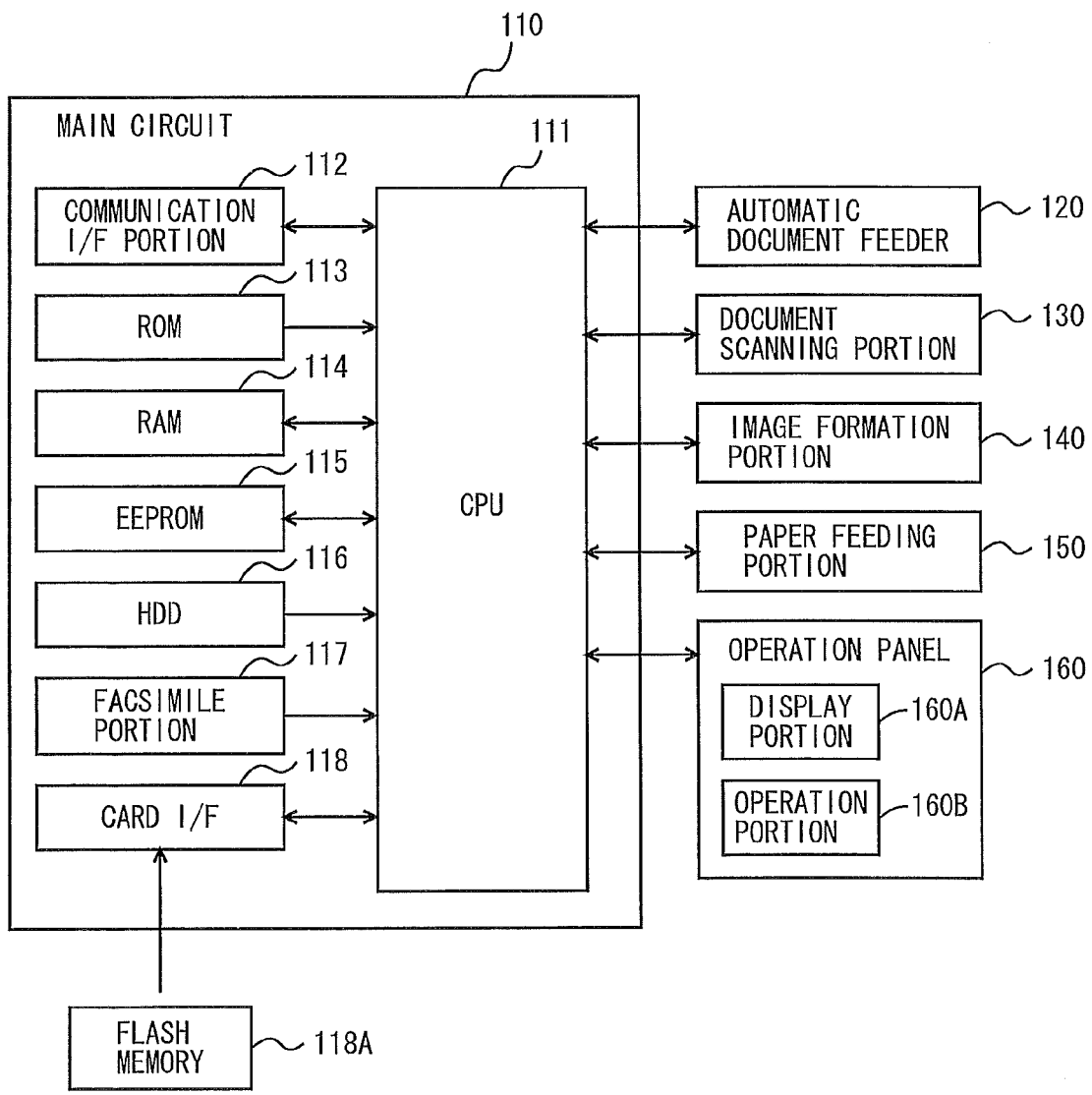
FIG. 3 is a block diagram showing an exemplary hardware configuration of MFP.

FIG. 2 is an external perspective view of MFP. FIG. 3 is a block diagram showing an exemplary hardware configuration of MFP. With reference to FIG. 2 and FIG. 3, MFP 100 includes a main circuit 110, a document scanning portion 130 for scanning a document, an automatic document feeder 120 for transferring a document to document scanning portion 130, an image formation portion 140 for forming on paper and the like a still image output by document scanning portion 130 scanning a document, a paper-feeding portion 150 for supplying paper to image formation portion 140, and an operation panel 160 as a user interface. Main circuit 110 includes a CPU 111, a communication interface (I/F) portion 112, a ROM 113, a RAM 114, an EEPROM (Electronically Erasable Programmable ROM) 115, a hard disk drive (HDD) 116 as a mass storage device, a facsimile portion 117, and a card interface (I/F) 118 to which a flash memory 118A is attached. CPU 111 is connected to automatic document feeder 120, document scanning portion 130, image formation portion 140, paper-feeding portion 150, and operation panel 160 to control MFP 100 as a whole.

ROM 113 stores a program executed by CPU 111 or data necessary to execute the program. RAM 114 is used as a work area when CPU 111 executes a program. RAM 114 also temporarily stores still images successively sent from document scanning portion 130.

Operation panel 160 is provided on the top face of MFP 100 and includes a display portion 160A and an operation portion 160B. Display portion 160A is a display device such as a liquid crystal display (LCD), an organic ELD (Electroluminescence Display) and displays instruction menus for users, information concerning the obtained image data, and the like. Operation portion 160B includes a plurality of keys and accepts inputs of data such as instructions, characters, and numerals through the user's operations corresponding to the keys. Operation portion 160B further includes a touch-panel provided on display portion 160A.

Communication I/F portion 112 is an interface for connecting MFP 100 to network 2. CPU 111 communicates with PC 300, 300A-300F, projector 200, and video camera 400 through communication I/F portion 112 to transmit/receive data. Communication I/F portion 112 can also communicate with a computer connected to the Internet via network 2.

Facsimile portion 117 is connected to a Public Switched Telephone Network (PSTN) to transmit facsimile data to a facsimile machine connected to PSTN or receive facsimile data from the facsimile machine. Facsimile portion 117 stores the received facsimile data into HDD 116 or outputs the same to image formation portion 140. Image formation portion 140 prints the facsimile data received by facsimile portion 117 on a sheet of paper. In addition, facsimile portion 117 converts the data stored in HDD 116 into facsimile data and transmits the converted data to a facsimile machine connected to PSTN.

Flash memory 118A is attached to card I/F 118. CPU 111 can access flash memory 118A through card I/F 118. CPU 111 loads an information providing program recorded on flash memory 118A attached to card I/F 118, into RAM 114 for execution. It is noted that the recording medium storing the program executed by CPU 111 is not limited to flash memory 118A and may be a flexible disk, a cassette tape, an optical disc (CD-ROM (Compact Disc-ROM)/MO (Magnetic Optical Disc)/MD (Mini Disc)/DVD (Digital Versatile Disc)), an IC card, an optical card, or a semiconductor memory such as a mask ROM, EPROM, EEPROM. Furthermore, the program executed by CPU 111 is not limited to a program stored in flash memory 118A, and a program stored in HDD 116 may be loaded into RAM 114 for execution. In this case, another computer connected to network 2 may overwrite the program stored in HDD 116 of MFP 100 or may additionally write a new program. Furthermore, MFP 100 may download a program from another computer connected to network 2 and store the program into HDD 116. The program referred to herein includes not only a program directly executable by CPU 111 but also a source program, a compressed program, an encrypted program, and the like.

Figure 4:
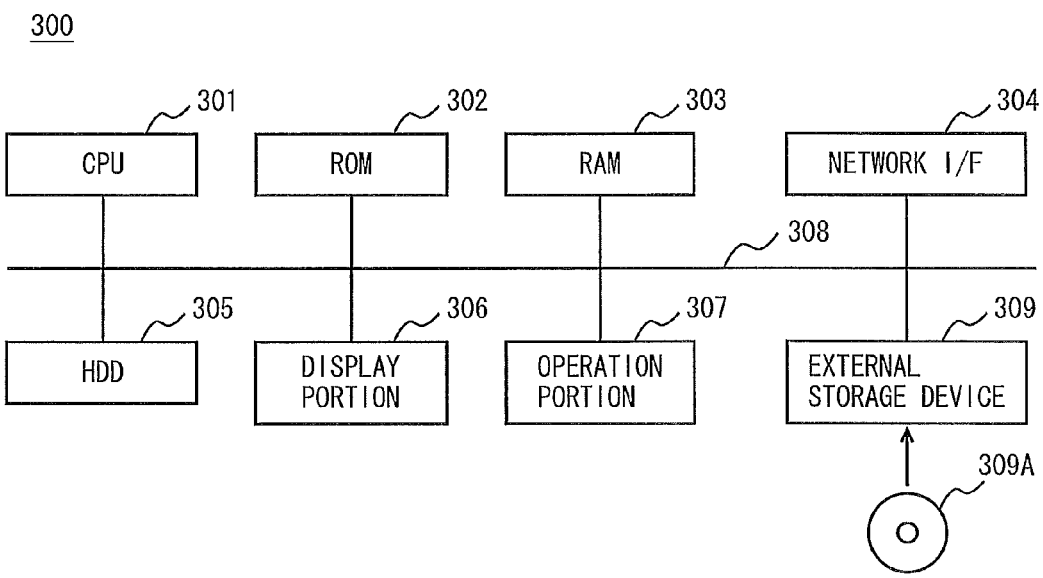
FIG. 4 is a block diagram showing an exemplary hardware configuration of PC.

PC 300, 300A-300F have the same configuration and function, and therefore PC 300 will be illustrated as an example. FIG. 4 is a block diagram showing an exemplary hardware configuration of PC. Referring to FIG. 4, PC 300 includes a CPU 301 for controlling the entire PC 300, a ROM 302 for storing programs and the like executed by CPU 301, a RAM 303 for use as a work area for CPU 301, a network I/F 304 for connecting PC 300 to a network, an HDD 305 as a mass storage device, a display portion 306, an operation portion 307 accepting input of the user's operation, and an external storage device 309, each of which is connected to a bus 308.

CD-ROM 309A storing a program is attached to external storage device 309. CPU 301 loads the program stored in CD-ROM 309A through external storage device 309 into RAM 303 for execution. It is noted that the recording medium storing a program is not limited to CD-ROM 309A and may be the above-noted recording mediums. The program stored in HDD 305 may be loaded in RAM 303 for execution. In this case, PC300 may download a program from another computer connected to network 2 and store the program in HDD 305. The program referred to herein includes not only a program directly executable by CPU 301 but also a source program, a compressed program, an encrypted program, and the like.

In the present embodiment, a presenter of a meeting stores presentation data of presentation materials in MFP 100 and remotely operates MFP 100 by PC 300 so that MFP 100 allows projector 200 to display the presentation data. The format of presentation data is not limited as long as it can be read by MFP 100. Here, the presentation data includes a plurality of pages, by way of example.

MFP 100 functions as a web server to transmit a Web page for remotely operating MFP 100 in response to a request from PC 300 and transmits an image of a page designated from the presentation data stored beforehand to projector 200. Accordingly, projector 200 displays an image of the page received from MFP 100. The presentation data may be transmitted to the projector and a page up/down instruction may be transmitted from MFP 100. In this case, projector 200 can generate an image of presentation data as long as an application program corresponding to the presentation data is installed therein, and therefore an application program corresponding to the presentation data does not have to be installed in MFP 100.

Meanwhile, participants of a meeting can operate PC 300A-300F to allow PC 300A-300F to receive and display presentation data from MFP 100, thereby viewing an image of the presentation data.

Figure 5:
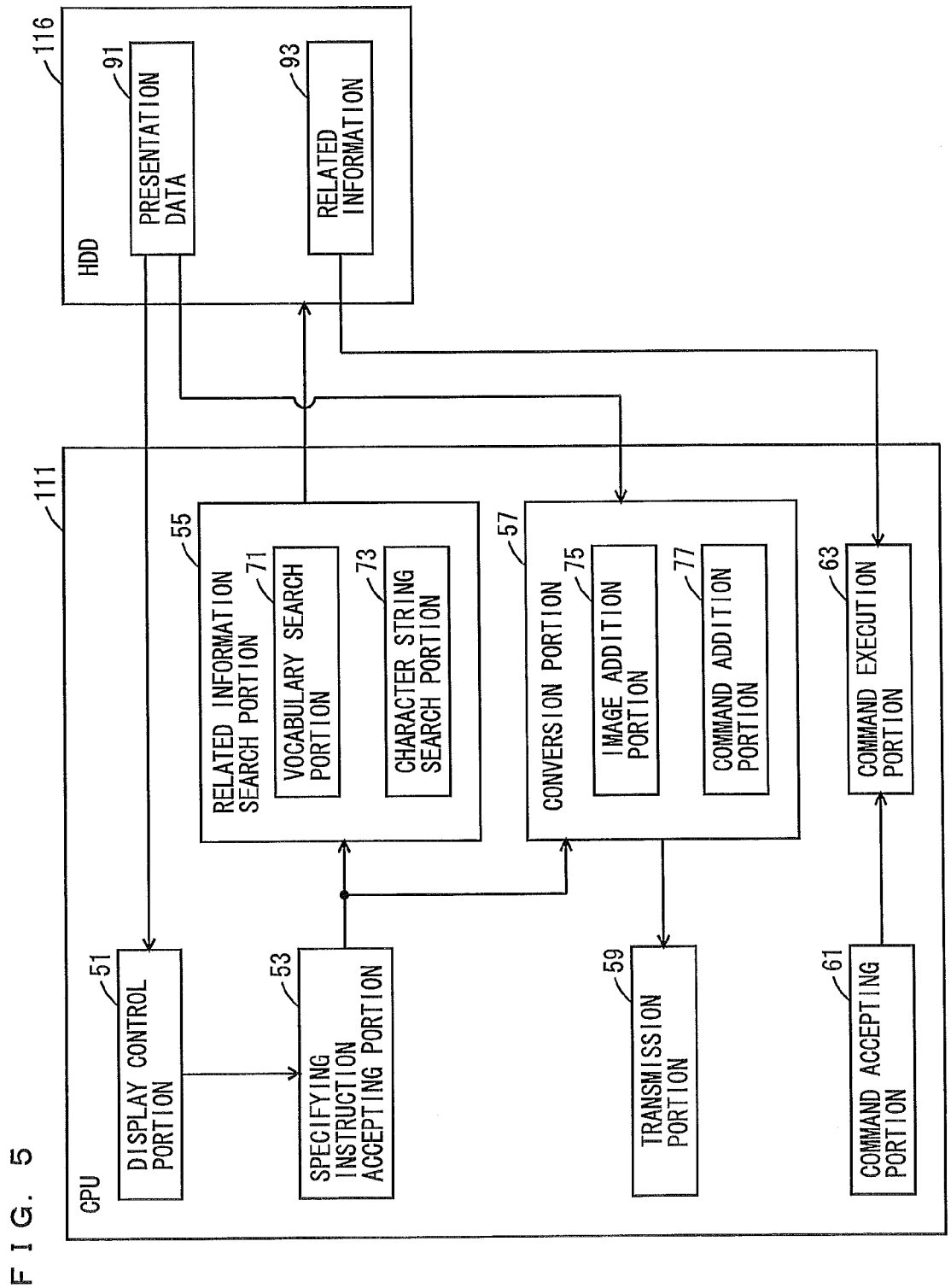
FIG. 5 is a functional block diagram showing an example of functions of CPU included in MFP.

FIG. 5 is a functional block diagram showing an example of functions of CPU of MFP together with information stored in HDD. Referring to FIG. 5, CPU 111 of MFP 100 includes a display control portion 51 outputting presentation data to projector 200 for display, a specifying instruction accepting portion 53 accepting a specifying instruction for specifying part of presentation data, a related information search portion 55 searching for related information related to a specified part specified by a specifying instruction, a conversion portion 57 converting presentation data into transmission data in which a specified part is associated with related information, a transmission portion 59 transmitting transmission data, a command accepting portion 61 accepting a command, and a command execution portion 63 executing a command.

Presentation data 91 is stored in HDD 116. Here, presentation data is transmitted from PC 300 operated by the presenter, received by communication I/F portion 112, and stored in HDD 116. The user generates presentation data beforehand in PC 300 and operates PC 300 to enter a command for transmission to MFP 100 into PC 300, so that the presentation data is transmitted from PC 300 to MFP 100. Although the format of presentation data 91 is not limited, the presentation data is here image data including a plurality of pages, by way of example.

Display control portion 51 reads presentation data 91 stored in HDD 116 to transmit the read data page-by-page to projector 200 through communication I/F portion 112 and also outputs page identification information for identifying a page transmitted to projector 200 to specifying instruction accepting portion 53. Display control portion 51 specifies a page transmitted to projector 200 in accordance with an operation input in PC 300 by the presenter. Specifically, a Web page for accepting specification of any of a plurality of pages included in presentation data 91 is transmitted to PC 300 through communication I/F 112. When the presenter inputs an operation to designate a page into PC 300 in accordance with the Web page displayed on PC 300, communication portion I/F 112 receives a page number as page identification information for specifying the page designated by the user from PC 300. Display control portion 51 transmits the page corresponding to the received page number to projector 200. Accordingly, an image of the page transmitted from MFP 100, of a plurality of pages included in presentation data, is projected and displayed on a screen by projector 200.

Specifying instruction accepting portion 53 accepts a specifying instruction that specifies part of an image of a page displayed by projector 200. Specifically, specifying instruction accepting portion 53 analyzes moving images transmitted from video camera 400 and detects a position on the screen pointed to by the presenter using a laser pointer or the like thereby to accept a specifying instruction. The specifying instruction includes positional information indicating a position in an image of a page that is detected by analysis of moving images. In the analysis of moving images, for example, a plurality of frames at different times among a plurality of frames included in moving images are compared with each other, so that a position pointed to by a laser pointer is specified. Specifying instruction accepting portion 53 accepts a specifying instruction to determine, as a specified part, that part of the image on the screen which is specified by the specifying instruction. Then, character recognition is performed on the image corresponding to the specified part of the page output to projector 200 by display control portion 51. In addition, specifying instruction accepting portion 53 outputs the specifying instruction to conversion portion 57 and also outputs a character string recognized by the character recognition to related information search portion 55 and conversion portion 57.

In a case where projector 200 or PC 300 has a function of specifying part of an image projected by projector 200 based on moving images picked up by video camera 400, a specifying instruction may be accepted from projector 200 or PC 300.

Related information search portion 55 receives a character string from specifying instruction accepting portion 53 to search for related information related to the character string. More specifically, related information search portion 55 includes a vocabulary search portion 71 and a character string search portion 73. Vocabulary search portion 71 searches a predetermined dictionary database with the character string received from specifying instruction accepting portion 53 and stores the dictionary information extracted through the search into HDD 116 as related information associated with the specified part. Specifically, related information includes dictionary information and a character string of a specified part. Related information 93 is thus stored in HDD 116. A predetermined dictionary database may be a database stored in HDD 116 or a database stored in a computer connected to the Internet connected via network 2.

Character string search portion 73 searches document data stored beforehand in HDD 116 with the character string received from specifying instruction accepting portion 53, sets document data extracted through the search as a related document, and stores the related document into HDD 116 as related information associated with the specified part. Related information 93 is thus stored in HDD 116. Specifically, related information includes a related document and a character string of a specified part. A related document is data that includes a character string input from specifying instruction accepting portion 53 in at least part of its file name or throughout the document itself. A search site connected to the Internet may be searched with a character string input from specifying instruction accepting portion 53, and a web page extracted by the search site may be set as a related document.

The related document extracted by the search in a search site is a web page including a character string input from specifying instruction accepting portion 53.

Conversion portion 57 converts presentation data into transmission data that allows extraction of related information searched for by related information search portion 55. More specifically, conversion portion 57 includes an image addition portion 75 and a command addition portion 77. Image addition portion 75 adds a guide image to a specified part of presentation data that is input from specifying instruction accepting portion 53. The guide image is an image for highlighting a character string included in the specified part of presentation data from other character strings and, for example, an underline or a rectangular image surrounding the character string for decorating the specified part. Here, a guide image is a rectangular image surrounding a character string.

Command addition portion 77 adds to presentation data a remote operation command for allowing MFP 100 to execute a predetermined process and an instruction image for accepting an instruction for executing the remote operation command. The combination of the instruction image and the remote operation command is, for example, an alias. The remote operation command is executed in response to the user designating an instruction image in a computer that displays the instruction image. Upon execution of the remote operation command, the computer that executes the remote operation command transmits an execution command included in the remote operation command to MFP 100. In MFP 100 receiving the execution command, a predetermined process is executed according to the received execution command.

The execution command includes, here, a dictionary search command for executing a process of obtaining dictionary information, a related document search command for executing a process of obtaining a related document, a print command for executing a process of printing presentation data, a transmission command for executing a process of transmitting presentation data, and an inquiry command for executing a process of inquiring of the presenter about the meaning of a character string in a specified part.

The remote operation command including the dictionary search command further includes a character string included in a specified part and is associated with the instruction image corresponding to the remote operation command such that the remote operation command is executed when that instruction image is designated. Upon execution of this remote operation command, the dictionary search command as an execution command and the character string included in the specified part are transmitted to MFP 100, and dictionary information received from MFP 100 is displayed.

The remote operation command including the related document search command further includes a character string included in a specified part and is associated with the instruction image corresponding to the remote operation command such that the remote operation command is executed when that instruction image is designated. Upon execution of this remote operation command, the related document search command as an execution command and the character string included in the specified part are transmitted to MFP 100, and a related document received from MFP 100 is displayed.

The remote operation command including the print command further includes a page number for identifying a page including a specified part and is associated with the instruction image corresponding to the remote operation command such that the remote operation command is executed when that instruction image is designated. Upon execution of this remote operation command, the print command as an execution command and the page number are transmitted to MFP 100. This causes MFP 100 to print presentation data.

The remote operation command including the transmission command further includes a page number for identifying a page including a specified part and is associated with the instruction image corresponding to the remote operation command such that the remote operation command is executed when that instruction image is designated. Upon execution of this remote operation command, the transmission command as an execution command and the page number are transmitted to MFP 100. This causes MFP 100 to transmit presentation data.

The remote operation command including the inquiry command further includes a specified part and is associated with the instruction image corresponding to the remote operation command such that the remote operation command is executed when that instruction image is designated. Upon execution of this remote operation command, the inquiry command as an execution command and the specified part are transmitted to MFP 100. This causes MFP 100 to transmit to the presenter an email for inquiring about the specified part of presentation data.

Furthermore, command addition portion 77 adds a display command for displaying the instruction image to presentation data in response to the guide image being designated. The display command is executed in response to the user designating the guide image in a computer displaying the guide image. Upon execution of the display command, the computer that executes the display command displays the instruction image. Here, five instruction images are displayed respectively corresponding to five remote operation commands for transmitting the dictionary search command, the related document search command, the print command, the transmission command, and the inquiry command.

Conversion portion 57 generates transmission data formed by adding a set of the guide image, the five remote operation commands, the instruction images respectively corresponding to the five remote operation commands, and the display command, to presentation data 91 for each specified part, and outputs the transmission data to transmission portion 59. The transmission data has the guide image added to a specified part of presentation data, so that the guide image is displayed on a computer that displays the transmission data when the transmission image is displayed. Then, when the guide image is designated by the user in that computer, the display command is executed by that computer and the five instruction images are displayed. Furthermore, when, of the five instruction images, the instruction image associated with the remote operation command including the dictionary search command or the instruction image associated with the remote operation command including the related document search command is designated, dictionary information including the character string included in the specified part or a related document including the character string included in the specified part in its file name or throughout the document itself is displayed. Therefore, the transmission data is data that allows extraction of dictionary information or a related document related to a specified part included in presentation data.

Transmission portion 59 transmits the transmission data to each of PC 300A-300F operated by participants through communication portion I/F 112. At a time when a user operates any one of PC 300A-300F and logs in to MFP 100 through a remote operation, transmission portion 59 stores user identification information for identifying the user who is logging in and device identification information of the device operated by that user, in association with each other. Then, transmission portion 59 transmits the transmission data to the one of PC 300A-300F that is operated by the user who is logging in. Accordingly, the transmission data can be displayed in PC operated by the user who is logging in, among PC 300A-300F.

Figure 6:
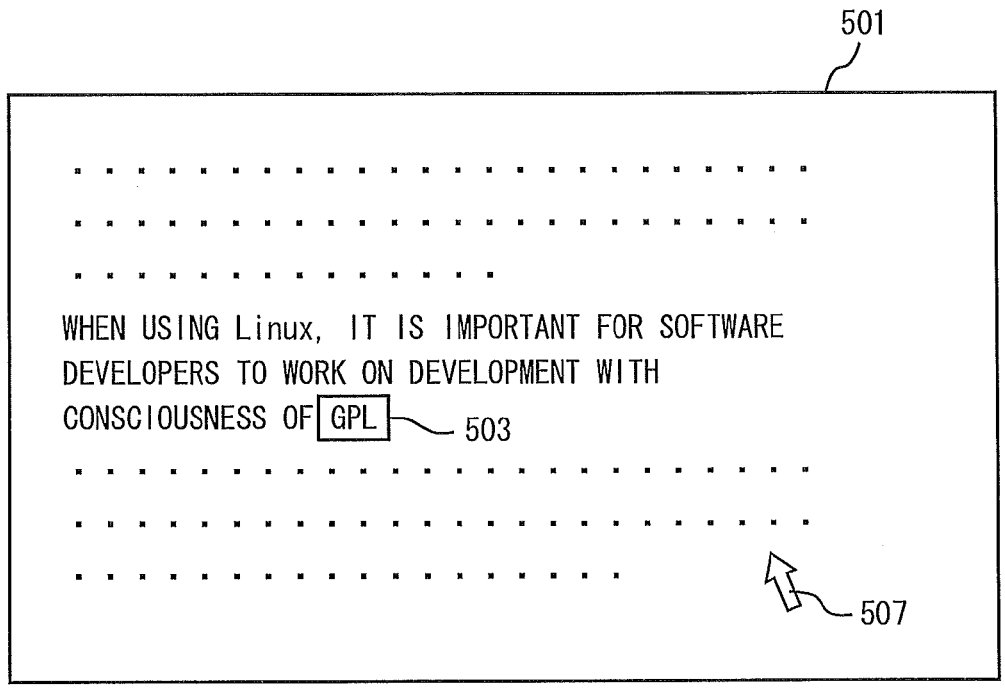
FIG. 6 is a first diagram showing an exemplary display manner of transmission data.

FIG. 6 is a first diagram showing an exemplary display manner of the transmission data. Referring to FIG. 6, a screen 501 including an image of a page containing the transmission data includes a character string included in the transmission data and guide image 503. Guide image 503 shows a specified part in the transmission data that is designated by the presenter. Here, guide image 503 is a rectangular image surrounding the specified part and shows that the image portion including the character string "GPL" corresponds to the specified part.

Figure 7:
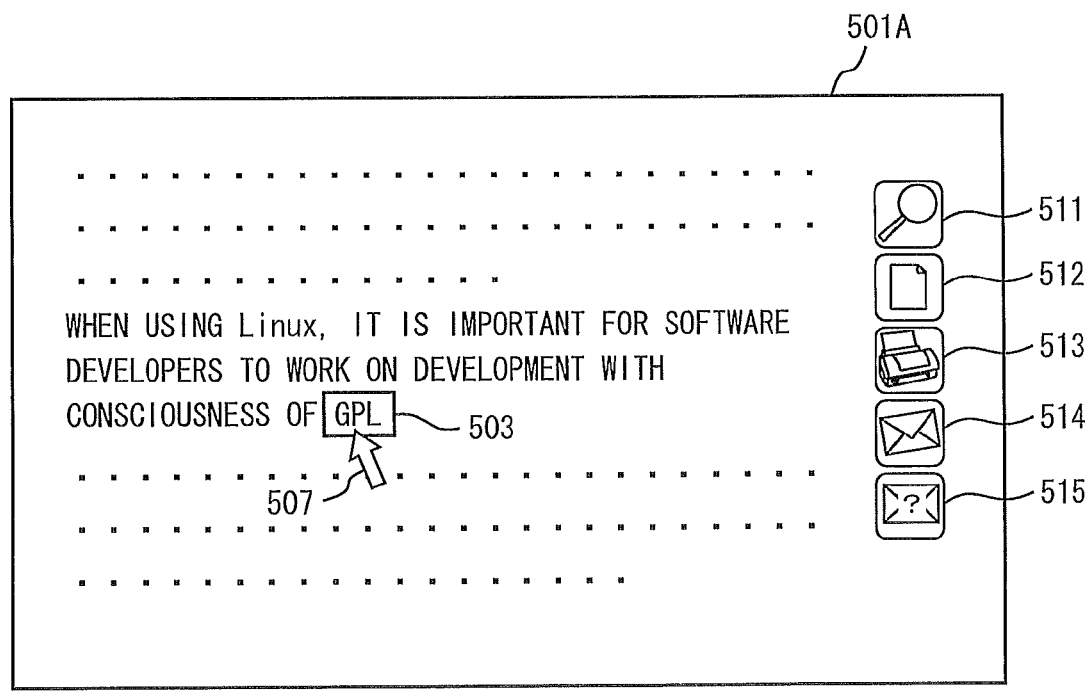
FIG. 7 is a second diagram showing an exemplary display manner of transmission data.

FIG. 7 is a second diagram showing an exemplary display manner of the transmission data. A screen 501A shown in FIG. 7 is a screen appearing after a mouse pointer 507 is operated by the user to overlap guide image 503 in screen 501 shown in FIG. 6 and shows a state in which guide image 503 is designated by the user. Screen 501A includes five instruction images 511-515 in addition to screen 501 shown in FIG. 6. In other words, when guide image 503 is pointed to by the mouse pointer by the user, five instruction images 511-515 show up.

Here, a participant operates PC 300A to display transmission data, by way of example. Instruction image 511 is associated with the remote operation command to allow MFP 100 to execute the dictionary search command for executing a process of obtaining dictionary information. When instruction image 511 is designated, the remote operation associated therewith is executed. PC 300A executing this remote operation command transmits the dictionary search command to MFP 100 and displays dictionary information received from MFP 100. The remote operation command for allowing MFP 100 to execute the dictionary search command includes the character string included in the specified part specified by guide image 503.

Instruction image 512 is associated with the remote operation command for allowing MFP 100 to execute the related document search command for executing a process of obtaining a related document. When instruction image 512 is designated, the remote operation command associated therewith is executed. PC 300A executing this remote operation command transmits the related document search command to MFP 100 and displays a related document received from MFP 100. The remote operation command for allowing MFP 100 to execute the related document command includes the character string included in the specified part specified by guide image 503.

Instruction image 513 is associated with the remote operation command for allowing MFP 100 to execute the print command for executing a process of printing presentation data. When instruction image 513 is designated, the remote operation command associated therewith is executed. PC 300A executing this remote operation command transmits the print command to MFP 100 and allows MFP 100 to print presentation data. The remote operation command for allowing MFP 100 to execute the print command includes a page number for identifying a page including the specified part of a plurality of pages included in the transmission data. Accordingly, an image of the page including the specified part of presentation data is printed on paper by MFP 100.

Instruction image 514 is associated with the remote operation command for allowing MFP 100 to execute the transmission command for executing a process of transmitting presentation data. When instruction image 514 is designated, the remote operation command associated therewith is executed. PC 300A executing this remote operation command transmits the transmission command to MFP 100 and allows MFP 100 to transmit presentation data. The remote operation command for allowing MFP 100 to execute the transmission command includes a page number for identifying a page including the specified part of a plurality of pages included in the transmission data. Accordingly, an email to which the page including the specified part of presentation data is attached is transmitted by MFP 100.

Instruction image 515 is associated with the remote operation command for allowing MFP 100 to execute the inquiry command for executing a process of inquiring of the presenter about the meaning of a character string in the specified part. When instruction image 515 is designated, the remote operation command associated therewith is executed. PC 300A executing this remote operation command transmits the inquiry command to MFP 100 and allows MFP 100 to transmit an email for inquiring of the presenter. The remote operation command for allowing MFP 100 to execute the inquiry command includes a character string included in the specified part of transmission data. Accordingly, an email is generated and transmitted by MFP 100, which includes the character string included in the specified part of presentation data and a document inquiring the meaning of that character string and in which a receiver address assigned to the presenter is set as a destination.

Returning to FIG. 5, when transmission portion 59 sends transmission data to each of PC 300A-300F, any of the five remote operation commands included in the transmission data may be executed by any of PC 300A-300F. In this case, the execution command of any of the dictionary search command, the related document search command, the transmission command, the print command, and the inquiry command is transmitted. When communication I/F portion 112 receives the execution command of any of the dictionary search command, the related document search command, the transmission command, the print command and the inquiry command from any of PC 300A-300F, command accepting portion 61 accepts the device identification information for identifying the one of PC 300A-300F that has transmitted the execution command and the received execution command from communication I/F portion 112. Command accepting portion 61 outputs a set of the device identification information and the received execution command to command execution portion 63.

In response to input of the execution command from command accepting portion 61, command execution portion 63 executes a process in accordance with that execution command. When the dictionary search command is input, command execution portion 63 searches for dictionary information of related information 93 stored in HDD 116, with the character string included in the specified part included in the dictionary search command. Then, dictionary information associated with the character string included in the specified part is extracted, and the extracted dictionary information is transmitted to the one of PC 300A-300F that is specified by the device identification information input with the dictionary search command, through communication I/F portion 112.

When the related document search command is input, command execution portion 63 searches for the related document of related information 93 stored in HDD 116, with the character string included in the specified part included in the related document search command. Then, a related document associated with the character string included in the specified part is extracted, and the extracted related document is transmitted to the one of PC 300A-300F that is specified by the device identification information input with the related document search command, through communication I/F portion 112.

When the print command is input, command execution portion 63 allows image formation portion 140 to print the image of the page specified by the page identification information included in the print command, among a plurality of pages included in presentation data.

When the transmission command is input, command execution portion 63 generates and transmits an email which includes the image of the page specified by the page identification information included in the transmission command, among a plurality of pages included in presentation data, and in which the email address assigned to the user who operates the one of PC300A-300F that has transmitted the transmission command is set as a receiver address.

When the inquiry command is input, command execution portion 63 generates and transmits an email which includes the character string included in the specified part included in the inquiry command and in which the email address assigned to the presenter is set as a receiver address and the email address assigned to the user who operates the one of PC 300A-300F that has transmitted the inquiry command is set as a sender address.

Figure 8:
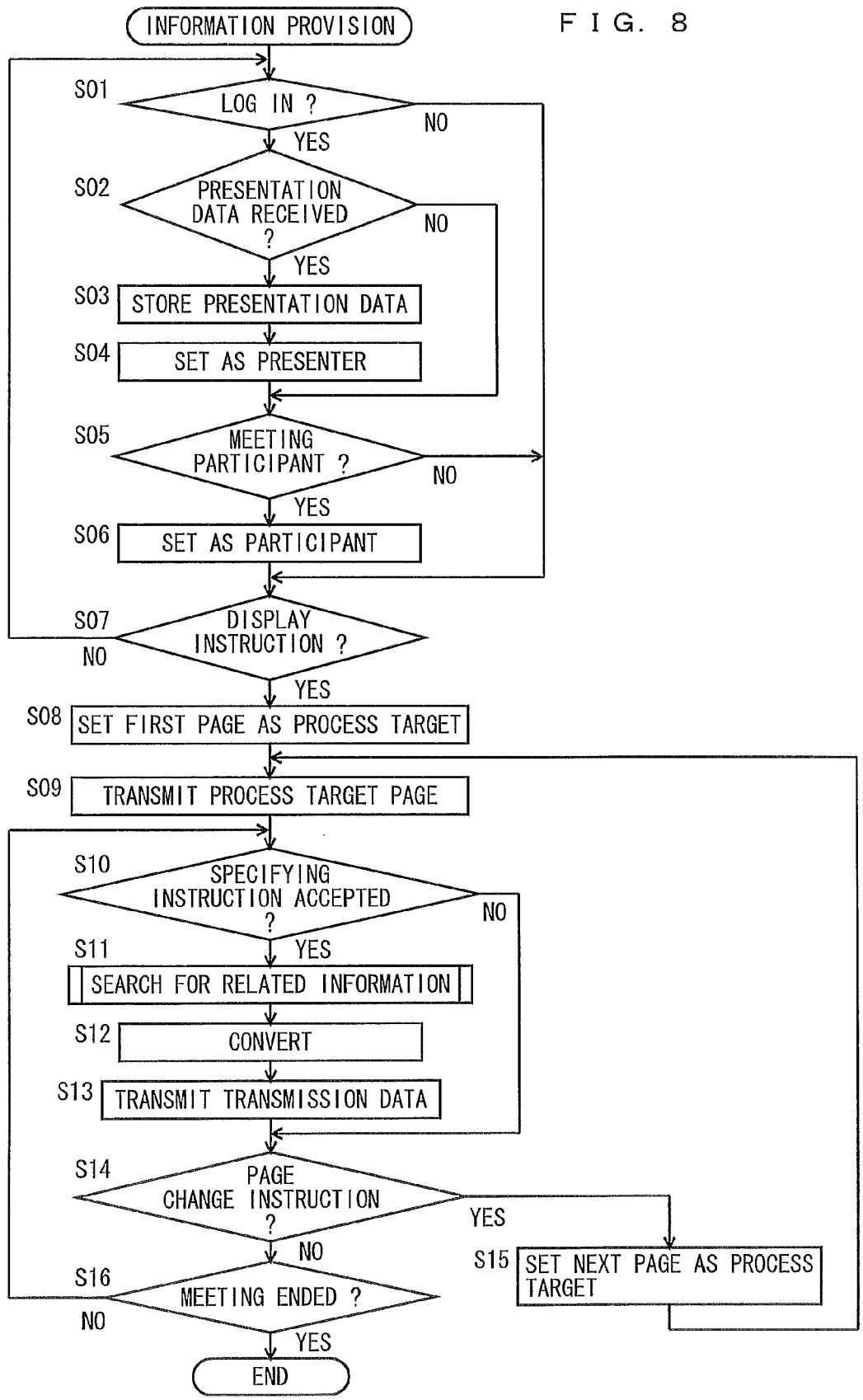
FIG. 8 is a flowchart showing an exemplary flow of an information providing process.

FIG. 8 is a flowchart showing an exemplary flow of an information providing process. The information providing process is a process executed by CPU 111 when CPU 111 of MFP 100 executes an information providing program. Referring to FIG. 8, CPU 111 determines whether or not a user log-in is accepted (step S01). If a log-in is accepted (YES in step S01), the process proceeds to step S02. If not (NO in step S01), the process proceeds to step S07. Specifically, a request for log-in is accepted from any one of PC 300, 300A-300F, and if authentication is successful, the process proceeds to step S02. In the following, the user whose log-in is accepted and authenticated is referred to as a log-in user. Here, the presenter operates PC 300 and participants operate PC 300A-300F by way of example.

In step S02, it is determined whether or not presentation data is received. If presentation data is received, the process proceeds to step S03. If not, the process proceeds to step S05. When the process proceeds to step S03, the received data is stored in HDD 116 (step S03) and the presenter is set as a log-in user (step S04). In other words, when the presenter logs in to MFP 100 from PC 300, the processes in steps S01-S04 are executed. In step S04, the user identification information for identifying the presenter and the device identification information of PC 300 are stored in association with each other.

In step S05, it is determined whether or not the log-in user is a participant of the meeting. The participants of the meeting are registered beforehand in MFP 100 in order to determine whether or not the log-in user is registered as a participant. If registered as a participant, the process proceeds to step S06. If not, step S06 is skipped and the process proceeds to step S07.

In step S06, the log-in user is set as a participant. For example, when a participant operates PC 300A and performs an operation of logging in to MFP 100, the processes in steps S01, S05 and S06 are executed. In step S06, the user identification information for identifying the participant and the device identification information of PC 300A are stored in association with each other.

In step S07, it is determined whether or not a display instruction is accepted. If a display instruction is accepted, the process proceeds to step S08. If not, the process returns to step S01. Specifically, if a display instruction for designating display is received by communication I/F portion 112 from PC 300 operated by the user set as a presenter, the display instruction is accepted. In other words, on condition that step S04 is executed and the user identification information of the presenter is stored, the display instruction is accepted. Here, after the presenter logs in (YES in step S02) and the display instruction is accepted (YES in step S07), a log-in by a participant is not accepted. However, after the display instruction is accepted (YES in step S07), a log-in by a participant may be accepted. When a log-in by a participant is accepted, the same process as in step S06 is executed, so that the user identification information of the participant who has logged in and the device identification information of PC operated by that participant are stored in association with each other.

In step S08, the first page of presentation data stored in step S03 is set as a process target, and the process proceeds to step S09. In step S09, the process target page is transmitted to projector 200 through communication I/F portion 112 in order to be displayed by projector 200. Accordingly, the first page of presentation data is projected by projector 200.

In the next step S10, it is determined whether or not the specifying instruction is accepted. Specifically, it is determined whether a position designated by a laser pointer by the user is detected or not by analyzing moving images received from video camera 400. If designation by a laser pointer is detected, the specified part in the first page corresponding to the designated position is specified. In the next step S11, a related information search process is executed. The related information search process, which will be detailed later, is a process of searching for related information based on the character string included in the specified part specified by the specifying instruction accepted in step S10.

In the next step S12, a conversion process is executed. The conversion process, which will be detailed later, is a process of converting presentation data into transmission data that allows extraction of related information related to a specified part.

In the next step S13, the transmission data obtained by converting presentation data in step S12 is transmitted to the one of PC300A-300F that is operated by the user set as a participant in step S06. Accordingly, the participant can display the transmission data on his operating PC.

In the next step S14, it is determined whether a page change instruction is accepted or not. If a page change instruction is accepted, the process proceeds to step S15. If not, the process proceeds to step S16. Specifically, a page change instruction is accepted if a page change instruction for changing a page is received by communication I/F portion 112 from PC 300 operated by the user set as a presenter. In step S15, the page following the page set as a process target is set as a new process target, and the process returns to step S09.

In step S16, it is determined whether the meeting is ended or not. If it is determined that the meeting is ended, the process ends. If not, the process returns to step S10. Specifically, a meeting end instruction is accepted if an instruction to indicate the end of the meeting is received by communication I/F portion 112 from PC 300 operated by the user set as a presenter.

In the information providing process as described above, if a specifying instruction is accepted (step S10), presentation data is converted into transmission data (step S13) and transmission data is transmitted (step S13). Alternatively, after a page change instruction is accepted (YES in step S14), or after a meeting end instruction is accepted (YES in step S16), presentation data may be converted into transmission data (step S12) and transmission data may be transmitted (step S13).

Figure 9:
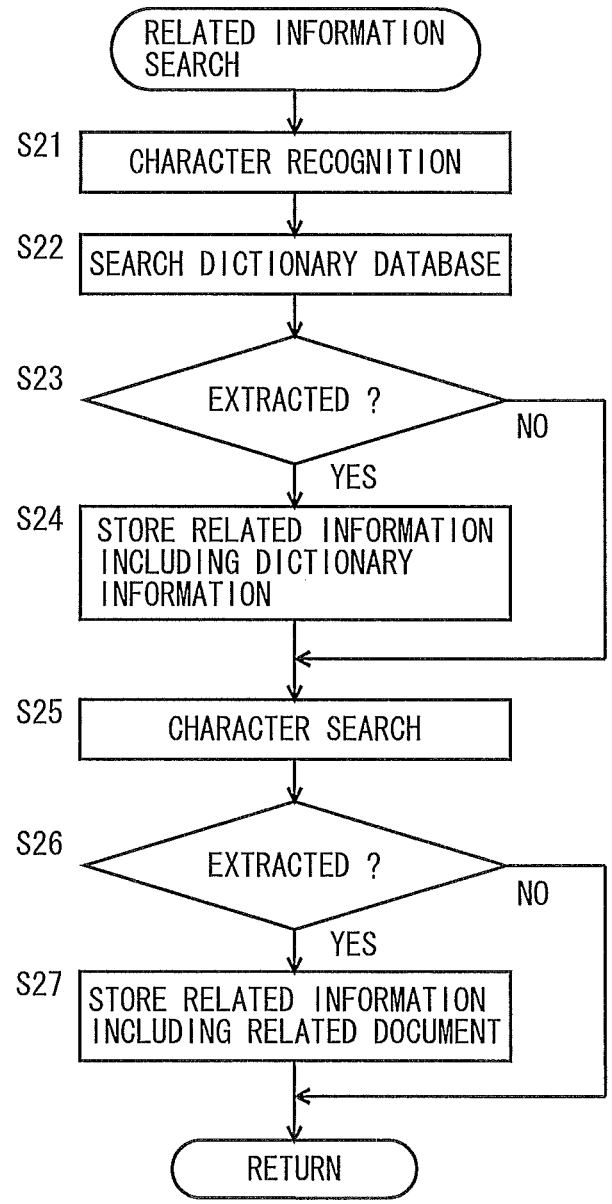
FIG. 9 is a flowchart showing an exemplary flow of a related information search process.

FIG. 9 is a flowchart showing an exemplary flow of the related information search process. The related information search process is a process executed in step S11 in FIG. 8. Referring to FIG. 9, first, a character included in the image of the specified part of the page set as a process target is recognized (step S21). A conventionally well-known character recognition process is executed to recognize a character included in the image.

In the next step S22, the dictionary database stored beforehand in HDD 116 is searched using the character string recognized in step S21. Then, it is determined whether dictionary information is extracted or not through the search (step S23). If dictionary information is extracted, the process proceeds to step S24. If not, step S24 is skipped and the process proceeds to step S25. In step S24, related information including the extracted dictionary information and the character string included in the specified part is stored in HDD 116, and the process proceeds to step S25.

In step S25, the documents stored beforehand in HDD 116 are searched using the character string recognized in step S21, and related information including the related document extracted through the search and the character string included in the specified part is stored in HDD 116 (steps S26, S27). The process then returns to the information providing process.

Figure 10:
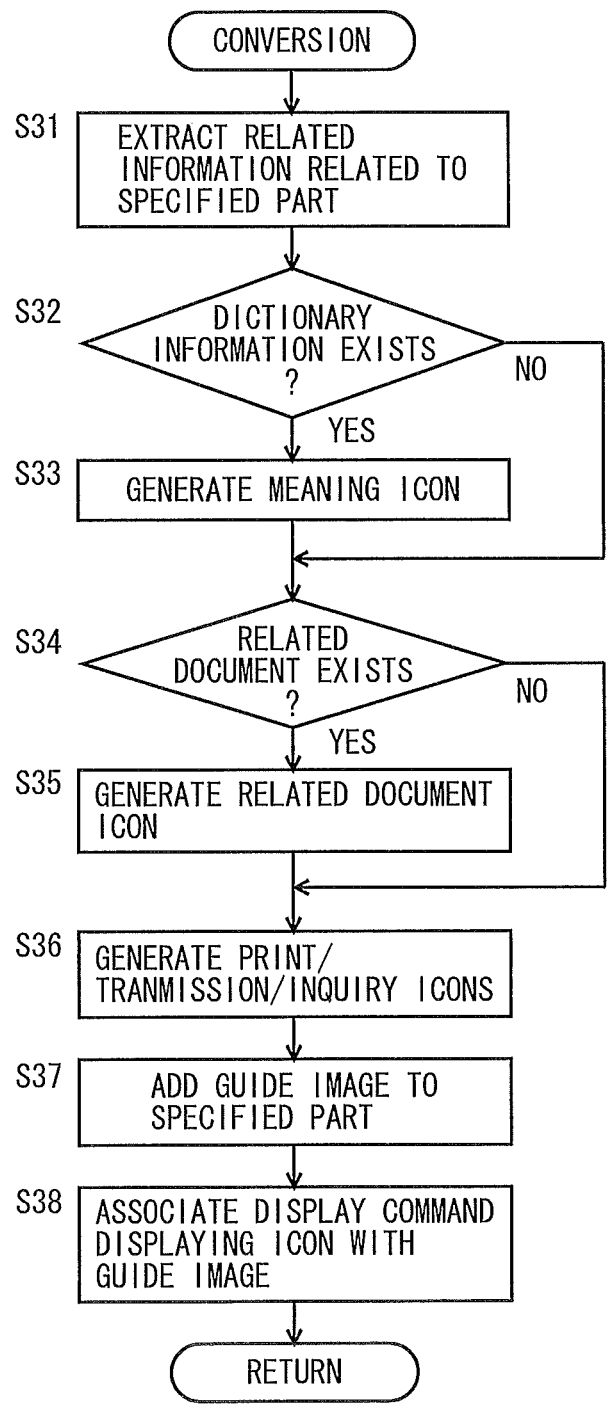
FIG. 10 is a flowchart showing an exemplary flow of a conversion process.

FIG. 10 is a flowchart showing an exemplary flow of the conversion process. The conversion process is a process executed in step S12 in FIG. 8. Referring to FIG. 10, in step S31, related information related to the specified part is extracted from related information 93 stored in HDD 116. Since related information is stored in HDD 116 by the above-noted related information search process, related information including the character string included in the specified part is extracted from related information stored in HDD 116.

In the next step S32, it is determined whether or not dictionary information is included in the extracted related information. If dictionary information is included, the process proceeds to step S33. If not, step S33 is skipped and the process proceeds to step S34. In step S33, a meaning icon is generated, and the process proceeds to step S34. The meaning icon is an instruction image associated with the dictionary search command for executing the dictionary search command. The dictionary search command includes the character string included in the image of the specified part.

In the next step S34, it is determined whether or not a related document is included in the extracted related information. If a related document is included, the process proceeds to step S35. If not, step S35 is skipped and the process proceeds to step S36. In step S35, a related document icon is generated, and the process proceeds to step S36. The related document icon is an instruction image associated with the related document search command for executing the related document search command. The related document search command includes the character string included in the image of the specified part.

In the next step S36, a print icon, a transmission icon, and an inquiry icon are generated. The print icon is an instruction image associated with the print command for executing the print command. The transmission icon is an instruction image associated with the transmission command for executing the transmission command. The inquiry icon is an instruction image associated with the inquiry command for executing the inquiry command.

Then, a guide image is added to the specified part of presentation data (step S37). The guide image, here, is a rectangular image surrounding the specified part. In the next step S38, a display command for displaying the meaning icon, the related document icon, the print icon, the transmission icon, and the inquiry icon generated in step S33, step S35, and step S36 is associated with the guide image, and the process returns to the information providing process. The display command is a command for displaying the meaning icon, the related document icon, the print icon, the transmission icon, and the inquiry icon when the guide image is designated.

Figure 11:
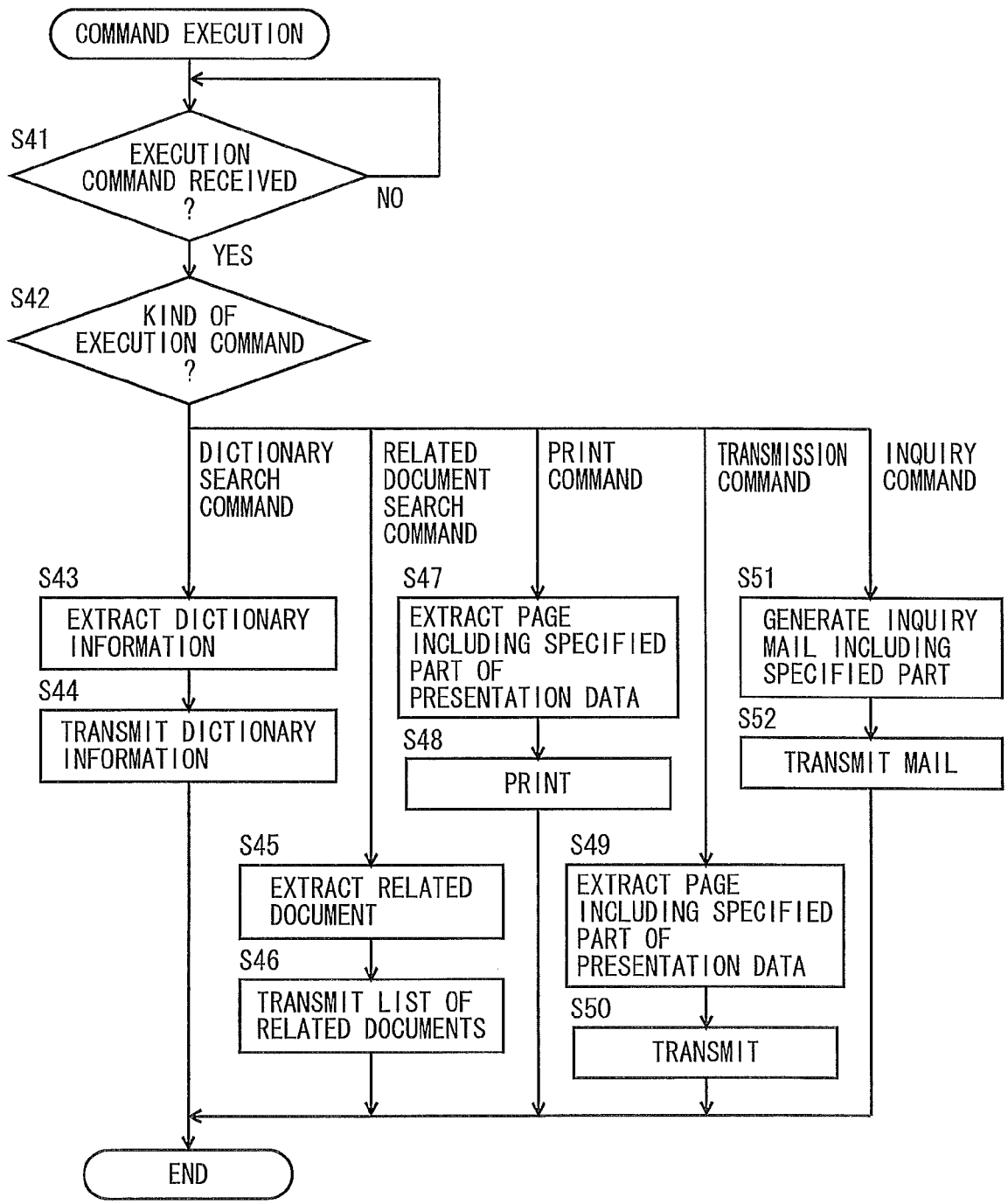
FIG. 11 is a flowchart showing an exemplary flow of a command execution process.

FIG. 11 is a flowchart showing an exemplary flow of the command execution process. The command execution process is a process executed by CPU 111 when CPU 111 of MFP 100 executes an information providing program. Referring to FIG. 11, CPU 111 determines whether an execution command is received or not (step S41). It is determined whether or not communication I/F portion 112 receives an execution command from the one of PC 300A-300F that is operated by a participant. The process is on standby until an execution command is received (NO in step S41). If an execution command is received, the process proceeds to step S42. In other words, the command execution process is a process executed on condition that communication I/F portion 112 receives an execution command from the one of PC 300A-300F that is operated by a participant.

In the next step S42, the process branches depending on the kind of the execution command. If the received command is the dictionary search command, the process proceeds to step S43. If it is the related document search command, the process proceeds to step S45. If it is the print command, the process proceeds to step S47. If it is the transmission command, the process proceeds to step S49. If it is the inquiry command, the process proceeds to step S51.

In step S43, related information 93 stored in HDD 116 is searched, related information 93 including the character string included in the dictionary search command is extracted, and dictionary information is extracted from the extracted related information 93 (step S43). Then, the extracted dictionary information is transmitted to the one of PC 300A-300F that has transmitted the dictionary search command (step S44). The process then ends.

In step S45, related information 93 stored in HDD 116 is searched, related information 93 including the character string included in the related document search command is extracted, and a related document is extracted from the extracted related information 93 (step S45). Then, the extracted related document is transmitted to the one of PC 300A-300F that has transmitted the related document search command (step S46).

In step S47, a page specified by the page number included in the print command is extracted from a plurality of pages included in presentation data. Then, the extracted page is printed by image formation portion 140 (step S48), and the process ends.

In step S49, a page specified by the page number included in the transmission command is extracted from a plurality of pages included in presentation data. Then, an email is generated and transmitted which includes the extracted page and in which the email address assigned to the log-in user who operates the one of PC 300A-300F that has transmitted the transmission command is set as a receiver (step S50). The process then ends.

In step S51, an email is generated which includes the character string included in the specified part received with the inquiry command and in which the email address assigned to the log-in user who operates the one of PC300A-300F that has transmitted the inquiry command is set as a sender, and the email address assigned to the presenter is set as a receiver (step S51). Then, the generated email is transmitted (step S52), and the process ends.

As described above, in meeting system 1 in the present embodiment, MFP 100 allows projector 200 to display presentation data. Meanwhile, when a specifying instruction for specifying a specified part of presentation data by a presenter is accepted, MFP 100 searches for related information such as dictionary information and a related document related to the specified part specified by the specifying instruction, converts the presentation data into transmission data that allows extraction of the related information related to the specified part, and transmits the transmission data to PC 300A-300F operated by participants. Therefore, it becomes possible to extract related information related to the specified part from the transmission data, so that the contents of presentation data can be enriched automatically. In addition, the participant who operates PC 300A, for example, may designate an instruction image only when he/she wants to view related information, so that the participant can view related information only when necessary. Conversely, related information is not displayed when not necessary, so that the user can be free from annoyance of unnecessary information forcedly displayed.

Furthermore, since the transmission data includes a guide image showing that related information is associated with the specified part, it is possible to display the part specified by the user in a highlighted manner and to extract related information to that part when the transmission data is displayed, for example, on PC 300A, thereby facilitating the operation.

Moreover, the transmission data includes a command for executing a predetermined process, an instruction image for accepting an instruction for executing the command, and a command for displaying the instruction image in response to designation of the guide image, which are further added to presentation data, thereby facilitating the operation for extracting related information.

Furthermore, in response to the specifying instruction being accepted, related information related to the specified part is searched for and the transmission data is transmitted. Therefore, it is possible to extract related information immediately after the presenter specifies the specified part, thereby accelerating the timing of viewing related information.

In addition, since related information is searched for and transmission data is transmitted after display of a page of presentation data is ended, the process of converting presentation data into transmission data is performed only once even in the case of a plurality of specified parts. This accelerates the processing speed in the case of a plurality of specified parts.

Although MFP 100 has been described as an example of the information providing apparatus in the embodiment described above, it is needless to say that the invention can be understood as an information providing method for executing the processes in FIG. 8-FIG. 11 and an information providing program for causing a computer to execute the information providing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information providing apparatus comprising:
   a display control portion to output presentation data for display on a display screen outside of the information providing apparatus;
   a specifying instruction accepting portion to accept an instruction for specifying a part of said presentation data, the part corresponding to a position displayed on the display screen pointed to by a presenter of the presentation data;
   a related information search portion to search for related information related to the specified part of the presentation data corresponding to the position on the display screen pointed to by the presenter;
   a conversion portion to convert said presentation data into transmission data from which said related information related to said specified part is able to be extracted by a participant apparatus; and
   a transmission portion to transmit said transmission data to the participant apparatus so that the related information is able to be extracted from the converted transmission data by the participant apparatus;
   wherein said transmission data includes at least one instruction image added to the presentation data and corresponding to the specified part, the at least one instruction image accepting a command from the participant apparatus for executing a predetermined process related to the specified part when the at least one instruction image is designated by the participant apparatus.

2. The information providing apparatus according to claim 1, wherein said conversion portion includes an image addition portion to add, to said presentation data, a guide image indicating that said related information is associated.

3. The information providing apparatus according to claim 2, wherein said at least one instruction image is displayed in response to said guide image being designated.

4. The information providing apparatus according to claim 1, wherein said related information search portion searches for related information related to said specified part in response to said specifying instruction being accepted.

5. The information providing apparatus according to claim 1, wherein said related information search portion searches for said related information after display of said output presentation data is ended.

6. The information providing apparatus according to claim 1, wherein said related information search portion includes a vocabulary search portion to search a predetermined dictionary database with a character string included in said specified part.

7. The information providing apparatus according to claim 1, wherein said related information search portion includes a character string search portion to search for data including a character string included in said specified part.

8. An information providing method comprising the steps of:
   outputting presentation data for display on a display screen outside of an information providing apparatus;
   accepting an instruction for specifying a part of said presentation data, the part corresponding to a position displayed on the display screen pointed to by a presenter of the presentation data;
   searching for related information related to the specified part of the presentation data corresponding to the position on the display screen pointed to by the presenter;

converting said presentation data into transmission data from which said related information associated with said specified part is able to be extracted by a participant apparatus; and transmitting said transmission data to the participant apparatus so that the related information is able to be extracted from the converted transmission data by the participant apparatus;

wherein said transmission data includes at least one instruction image added to the presentation data and corresponding to the specified part, the at least one instruction image accepting a command from the participant apparatus for executing a predetermined process related to the specified part when the at least one instruction image is designated by the participant apparatus.

9. The information providing method according to claim 8, wherein said step of converting includes the step of adding, to said presentation data, a guide image indicating that said related information is associated.

10. The information providing method according to claim 9, wherein said at least one instruction image is displayed in response to said guide image being designated.

11. The information providing method according to claim 8, wherein said searching step includes the step of searching for related information related to said specified part in response to said specifying instruction being accepted.

12. The information providing method according to claim 8, wherein said searching step includes the step of searching for said related information after display of said output presentation data is ended.

13. The information providing method according to claim 8, wherein said step of searching includes the step of searching a predetermined dictionary database with a character string included in said specified part.

14. The information providing method according to claim 8, wherein said step of searching includes the step of searching for data including a character string included in said specified part.

15. An information providing program embodied on a non-transitory computer readable medium for allowing a computer to execute processing including the steps of:

outputting presentation data for display on a display screen outside of an information providing apparatus;

accepting an instruction for specifying a part of said presentation data, the part corresponding to a position displayed on the display screen pointed to by a presenter of the presentation data;

searching for related information related to the specified part of the presentation data corresponding to the position on the display screen pointed to by the presenter;

converting said presentation data into transmission data from which said related information associated with said specified part is able to be extracted by a participant apparatus; and transmitting said transmission data to the participant apparatus so that the related information is able to be extracted from the converted transmission data by the participant apparatus;

wherein said transmission data includes at least one instruction image added to the presentation data and corresponding to the specified part, the at least one instruction image accepting a command from the participant apparatus for executing a predetermined process related to the specified part when the at least one instruction image is designated by the participant apparatus.

16. The information providing program embodied on a non-transitory computer readable medium according to claim 15, wherein said step of converting includes the step of adding, to said presentation data, a guide image indicating that said related information is associated.

17. The information providing program embodied on a non-transitory computer readable medium according to claim 16, wherein said at least one instruction image is displayed in response to said guide image being designated.

18. The information providing program embodied on a non-transitory computer readable medium according to claim 15, wherein said searching step includes the step of searching for related information related to said specified part in response to said specifying instruction being accepted.

19. The information providing program embodied on a non-transitory computer readable medium according to claim 15, wherein said searching step includes the step of searching for said related information after display of said output presentation data is ended.

20. The information providing program embodied on a non-transitory computer readable medium according to claim 15, wherein said step of searching includes the step of searching a predetermined dictionary database with a character string included in said specified part.

21. The information providing program embodied on a non-transitory computer readable medium according to claim 15, wherein said step of searching includes the step of searching for data including a character string included in said specified part.

* * * * *